(12) United States Patent
Fraisse et al.

(10) Patent No.: US 7,343,867 B2
(45) Date of Patent: Mar. 18, 2008

(54) METHOD FOR PRESCRIBING SITE-SPECIFIC FERTILIZER APPLICATION IN AGRICULTURAL FIELDS

(75) Inventors: Clyde Fraisse, Prosser, WA (US); Haiping Su, Plymouth, MN (US); Paul Joseph Harroun, Bloomington, IL (US); Timothy A. Lindgren, Crystal, MN (US)

(73) Assignee: The Mosaic Company, Minnetonka, MN (US)

( * ) Notice: Subject to any disclaimer, the term of this patent is extended or adjusted under 35 U.S.C. 154(b) by 0 days.

(21) Appl. No.: 11/643,647

(22) Filed: Dec. 21, 2006

(65) Prior Publication Data

US 2007/0186830 A1    Aug. 16, 2007

Related U.S. Application Data

(63) Continuation of application No. 11/085,589, filed on Mar. 21, 2005, now Pat. No. 7,171,912, which is a continuation of application No. 10/083,681, filed on Feb. 26, 2002, now Pat. No. 6,889,620.

(60) Provisional application No. 60/272,158, filed on Feb. 28, 2001.

(51) Int. Cl.
*A01C 23/00* (2006.01)

(52) U.S. Cl. .............. 111/118; 111/900; 111/903; 382/110; 700/89; 700/283

(58) Field of Classification Search ............ 111/200, 111/118–120, 127–129, 903; 700/46, 283, 700/89; 382/110, 191; 701/50; 702/2, 5, 702/50; 239/1, 61

See application file for complete search history.

(56) References Cited

U.S. PATENT DOCUMENTS

| 3,852,750 A | 12/1974 | Klein |
| 4,013,875 A | 3/1977 | McGlynn |
| 4,479,444 A | 10/1984 | Takata |
| 4,630,773 A | 12/1986 | Ortlip |

(Continued)

OTHER PUBLICATIONS

Kaufman et al.., "Algorithm for automatic atmospheric corrections to visible and near-IR satellite imagery," *Int. J. Remote Sensing*, 9(8):1357-1381 (1988).

(Continued)

*Primary Examiner*—Christopher J. Novosad
(74) *Attorney, Agent, or Firm*—Patterson, Thuente, Skaar & Christensen, P.A.

(57) ABSTRACT

A map of site-specific amounts of a soil nutrient, to be applied in fertilizer to an agricultural field is created using a map of site-specific amounts of the soil nutrient needed to produce the maximum possible yield at the particular site. Subtracted from the site-specific amounts of nutrient needed are site-specific amounts of the nutrient currently existing in the field, thus producing the map of site-specific nutrient amounts to be added. The nutrient amounts may be added to the soil using the map and conventional variable-rate fertilizer application methods. In one embodiment, the amounts of the soil nutrient needed to produce the maximum possible yield at each site is created using a map of site-specific measures of biomass produced by the field in a past growing season or seasons, which in turn is created from a remotely sensed biomass image.

25 Claims, 7 Drawing Sheets

U.S. PATENT DOCUMENTS

| | | | |
|---|---|---|---|
| 4,984,279 | A | 1/1991 | Kidney et al. |
| 5,033,397 | A | 7/1991 | Colburn, Jr. et al. |
| 5,220,876 | A | 6/1993 | Monson et al. |
| 5,323,317 | A | 6/1994 | Hampton et al. |
| 5,355,815 | A | 10/1994 | Monson |
| 5,479,992 | A | 1/1996 | Bassett |
| 5,519,609 | A | 5/1996 | Kuchenrither et al. |
| 5,668,719 | A | 9/1997 | Bobrov et al. |
| 5,673,637 | A | 10/1997 | Colburn |
| 5,721,679 | A | 2/1998 | Monson |
| 5,841,282 | A | 11/1998 | Christy et al. |
| 5,845,229 | A | 12/1998 | Rawlins |
| 5,955,973 | A | 9/1999 | Anderson |
| 6,070,539 | A | 6/2000 | Flamme et al. |
| 6,091,997 | A | 7/2000 | Flamme et al. |
| 6,122,581 | A | 9/2000 | McQuinn |
| 6,138,590 | A | 10/2000 | Colburn, Jr. |
| 6,141,614 | A | 10/2000 | Janzen et al. |
| 6,216,614 | B1 | 4/2001 | Wollenhaupt |
| 6,236,907 | B1 | 5/2001 | Hauwiller et al. |
| 6,266,432 | B1 | 7/2001 | Weins |
| 6,266,595 | B1 | 7/2001 | Greatline et al. |
| 6,389,999 | B1 | 5/2002 | Duello |
| 6,393,927 | B1 | 5/2002 | Biggs et al. |
| 6,484,652 | B1 | 11/2002 | Colburn, Jr. |
| 6,549,852 | B2 | 4/2003 | Hanson |
| 6,570,999 | B1 | 5/2003 | Monson |
| 6,606,542 | B2 | 8/2003 | Hauwiller et al. |
| 6,792,684 | B1 | 9/2004 | Hyyppa |
| 6,889,620 | B2 | 5/2005 | Fraisse et al. |

OTHER PUBLICATIONS

Kuusk, "A Fast, Invertible Canopy Reflectance Model," *Remote Sensing of Environment*, 51:342-50 (1995).

Moore et al., "Soil Attribute Prediction Using Terrain Analysis," *Soil Sci. Soc. Am. J.*, 57:443-452 (1993).

Richter, "A fast atmospheric correction algorithm applied to Landsat TM images," *Int. J. of Remote Sensing*, 11:159-166 (1990).

Richter, "Correction of atmospheric and topographic effects for high spatial resolution satellite imagery," *Int. J. of Remote Sensing*, 18(5):1099-1111 (1997).

Tisdale et al., "Soil Fertility and Fertilizers", Fifth Edition, 1993, Pretice Hall, Inc. Upper Saddle river, New Jersey, pp. 350-351.

Verhoef, "Light Scattering by Leaf Layers with Application to Canopy Reflectance Modeling: The SAIL Model," *Remote Sensing of Environment*, 16:125-41 (1984).

Mathot, H., "*Challenges Facing the Fertilizer Industry*," IFA-FAO Agriculture Conference, 19 pgs., found on http://www.fertilizer.org/ifa/publicat/PDF/2003_rome_mathot.pdf#search=%22insite%20vrn%22, Rome, Italy Mar. 26-28, 2003.

METHOD FOR PRESCRIBING SITE-SPECIFIC FERTILIZER APPLICATION IN AGRICULTURAL FIELDS

CROSS-REFERENCE TO RELATED APPLICATIONS

This application is a continuation of application Ser. No. 11/085,589 filed Mar. 21, 2005, now U.S. Pat. No. 7,171,912 which in turn is a continuation of application Ser. No. 10/083,681 filed Feb. 26, 2002, now U.S. Pat. No. 6,889,620 which claims the benefit of U.S. Provisional Application No. 60/272,158 filed Feb. 28, 2001.

TECHNICAL FIELD

This invention relates to a method/process that prescribes the site-specific application of fertilizers in agricultural fields, and more particularly to minimizing the amount of fertilizer that is applied while maintaining the maximum possible yield for the field.

BACKGROUND

Fertilizers supply nutrients to the soil needed to produce various crops. The most common nutrients in soil are nitrogen, phosphorous and potassium. In addition, some crops require micronutrients, such as zinc (Zn) and iron (Fe), depending on soils. Fertilizer of course costs money, but the risk of lower yields resulting from under-fertilizing has in the past generally outweighed the monetary cost of over-fertilizing. Because the production of nitrogen supplying fertilizers typically requires natural gas, the volatility in natural gas pricing can cause nitrogen fertilizer prices to escalate unpredictably. In addition, the overuse of fertilizer creates the potential for negative environmental consequences, and so from an environmental perspective too it is desirable to minimize the application of fertilizers. Some governments in fact, in Europe for the most part, closely regulate the amount of fertilizers that farmers apply.

A conventional method for calculating nitrogen needs for a field involves the following equation:

$$N_{FERT} = N_{CROP} - N_{RES.SOIL} - (N_{OM} + N_{PREV.CROP} + N_{MANURE}) - N_{IRR}$$

where: $N_{FERT}$=fertilizer N recommendation
$N_{CROP}$=yield goal×N yield factor
$N_{RES.SOIL}$=preplant soil profile $NO_3$-content (or residual soil)
$N_{OM}$=organic N mineralization
$N_{PREV.CROP}$=legume N availability
$N_{MANURE}$=manure N availability
$N_{IRR}$=irrigation water N availability Havlin et al., *Soil Fertility and Fertilizers*, 1999, Prentice Hall, New Jersey, at pages 350-51. The equation above differs from that provided in Havlin et al., in that the equation above factors in the availability of N from irrigation water ($N_{IRR}$). As discussed by Havlin et al. on page 351, $N_{CROP}$ represents the nitrogen required by the crop and involves predicting the crop yield and the nitrogen needed to produce that yield. A measure of "biomass," which is basically the density or amount of plant-life, is known to be directly related to crop yield. One measure of biomass for crops such as corn and soybeans is known as "leaf area index" (LAI), which can be measured in at least two ways. First, LAI can be measured directly by taking all the crop leaves from a unit field area and measuring in a laboratory the total area of one side of the leaves using an area meter. Another way by which LAI can be derived is from remotely sensed data using a canopy reflectance model. See Kuusk, "A Fast, Invertible Canopy Reflectance Model," in *Remote Sensing of Environment*, 51:342-50 (1995); Verhoef, "Light Scattering by Leaf Layers with Application to Canopy Reflectance Modeling: The SAIL Model," in *Remote Sensing of Environment*, 16:125-41 (1984). The later method is non-destructive to the crops and suitable for agricultural field management.

Precision farming techniques utilizing, for example, Global Positioning System (GPS) technology has found many uses, one being the application of fertilizers in agricultural fields, as is described, for example, in U.S. Pat. No. 5,220,876 to Monson et al. The '876 patent describes a variable-rate fertilizer application system. The system has a digital map characterizing the field's soil types. The system also has other maps that characterize the desired level of various fertilizer types to be applied upon the field. The patent states that the levels of fertilizer can be determined from pre-defined characteristics, such as existing fertilizer levels, field topography or drainage studies. A processor calculates and controls the dispensing of the various fertilizers based on both the soil map and the fertilizer map. A position locator on the vehicle dispensing the fertilizers provides the necessary location information to apply the prescribed amount of fertilizer in the correct location. Related U.S. Pat. No. 5,355,815 to Monson describes a closed-loop fertilizer application system, which also varies the application rate, but which does not require maps of current fertilizer levels. The system is said to be able to determine a chemical prescription in real-time for a soil scene, depending on the existing soil fertilizer content ascertained by a real-time soil analyzer. The system then dispenses fertilizer in response to the prescription.

Another variable-rate fertilizer application system is described in U.S. Pat. No. 4,630,773 to Ortlip. The '773 Patent describes a system that applies fertilizer according to the specific needs of each individual soil type of soil comprising a field. The patent also describes the assembly of a digital soil map for a field to be fertilized. An aerial infrared photograph of the field is taken. The patent states that the different shades in the photograph correspond to different moisture contents of the soil types. The photograph is digitized into an array of pixels. Each pixel is assigned a digital value based on the shading in the photograph, such that the value is representative of the soil type the pixel represents. The application of fertilizer is varied according to the digital soil map.

The maximum possible crop yield—that is, "yield goal," which factors into the calculation of $N_{CROP}$ in the equation above—that a particular location in a field is able to attain may vary from location to location. For example, there may be a patch of gravel in a field, and no matter how much nitrogen-based fertilizer is added to that location, the yield in that location will not increase. The gravel may cause only weeds to grow at that location, or may hinder the growth of any vegetation. Gravel may be on the surface, or may be at a shallow level below the surface. The gravel may not be detectable from a soil image. Other factors that may vary the yield at a particular location in a field, but which also may not be detectable from a soil image, are the soil's fertility and its pH content. Despite this potential variation in yield throughout a single field, the prior art variable-rate fertilizer application systems of which the present inventors are aware all employ a single yield goal measure for a field.

SUMMARY

In general, the invention is a method and system that regulates the amount of fertilizer that is applied to agricultural fields while still maintaining the maximum possible crop yield. In one aspect, the invention involves the creation of a map for an agricultural field of site-specific amounts of a soil nutrient needed at each site to produce the maximum possible crop yield that the site is capable of producing. Subtracted from the site-specific amounts of nutrient needed for the crop are site-specific amounts of the nutrient currently existing in the field, thus producing a map of site-specific amounts of the soil nutrient that need to be applied to the field in a fertilizer using conventional variable rate fertilizer application methods. The invention has applicability to crops such as corn, both for grain and seed, grain sorghum, soybeans, cotton, cereal grains, such as barley and wheat, and forage crops. When reference is made herein to "crop" or "crops" generally, it will be understood to encompass grasses unless the context indicates otherwise.

In various embodiments, site-specific maximum possible crop yield, or "yield goal," predictions may be based on site-specific measures of biomass, such as a conventional leaf area index (LAI) for example, that the field produced in a past growing season or seasons. A site-specific measures of biomass could be also produced from a vegetation index, which is derived from visible and near-infrared bands of satellite images, such as normalized difference vegetation index (NDVI) and soil-adjusted vegetation index (SVI). Alternatively, site-specific maximum crop yield predictions may be based on a map of site-specific measures of a conventional soil wetness index. The site-specific measures of soil wetness index may be based on topographic data for the field or other derivative methods, such as deriving from soil brightness index as topography surrogate layer. The methods and systems of the invention are helpful in the prediction of various soil nutrients that are commonly applied by fertilizer, such as nitrogen, phosphorous, potassium, organic fertilizers (manure), and micronutrients (e.g., Zn and Fe). In another aspect of the invention, the systems and methods include the use of a variety of methods to predict a field's organic matter content of the soil nutrient. In one embodiment, a bare soil image of the field acquired before planting is used to create a site-specific map of organic matter content of the nutrient in the soil, while in another embodiment, samples of the soil's electrical conductivity are used to create the site-specific map of organic matter content of the nutrient in the soil.

Particular implementations of the invention will have one or more of the following advantages. The amount of fertilizer applied to agricultural fields may be reduced with no impact on crop yield, thus reducing the cost of producing crops and the potential adverse environmental consequences of over-fertilizing. Fertilizer will not be wasted on areas of a field that will never reach high yields, for example, areas that have gravel that negatively impacts the yield. Also, a display of the site-specific information used and produced by the invention to a farmer may provide the farmer with the needed confidence that a decision to reduce the amount of fertilizers in certain areas of a field will have no negative impact on yield, thereby making it more likely that the producers will in fact reduce the amount of fertilizers to those areas. In addition, fertilization with a constant flat rate may result in under-fertilizing some highly productive areas in a given field. Increasing the rate of fertilizer to highly productive areas can result in increased overall yields while not substantially increasing the total amount of fertilizer applied to the total land area. Some embodiments of the invention avoid the use of costly and time-consuming soil samplings, such as are employed by prior art methods, although it will be recognized that some embodiments of the present invention still utilize soil samplings.

Some embodiments of the invention may be used to affect crop quality as well as yield. For instance, in hard red, (bread) wheat, a minimum protein level must be achieved to meet grading standards. Insufficient soil nitrogen causes protein levels to be sub-standard; the method may be used to apply additional nitrogen to areas that are detected to be deficient. Conversely, high protein in malting barley is a deleterious trait. It is desirable to apply sufficient nitrogen to ensure adequate yields, yet just enough such that the nitrogen is "used up" by the crop and excess is not available to be converted to protein. The method can be used to minimize the amount of nitrogen to field areas that exhibit high levels of residual nitrogen. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
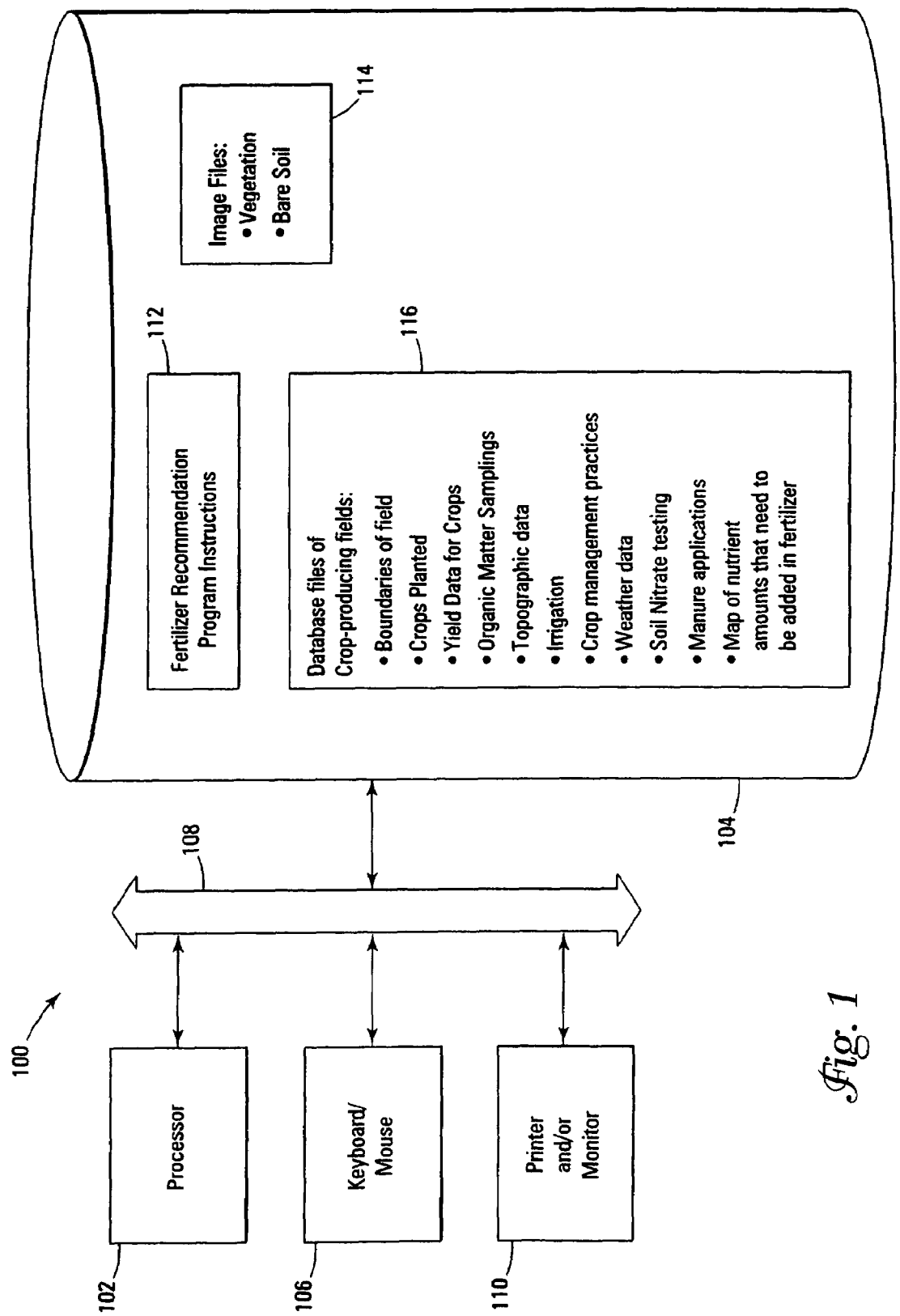
FIG. 1 is a block diagram of a computer system containing in memory a computer program in accordance with the invention.

As shown in FIG. 1, a conventional computer system 100 has at least a processor component 102 capable of executing computer program instructions, a memory component 104 for storing programs and data, a user interface device or devices 106 by which a person—a user— may interact with programs running on the system 100, and an output device or devices 110 such as a printer or a video monitor. These and other components are connected to interact with each other by one or more buses 108. The memory component 104 will generally include a volatile random access memory (RAM), a non-volatile read-only memory (ROM), and one or more large disk drives for data and programs storage.

Residing in memory 104 is a software program in accordance with the invention. As is conventional, the software program has program instructions 112 that may be executed to operate on data from various image files 114 and a database 116 of information pertaining to one or more agricultural fields. The image files 114 may include, in one embodiment of the invention, a satellite image of growing crops taken at a time when the biomass of the crops are at their peak and another satellite image of bare soil taken some time before planting. These images will be discussed in more detail later. The database 116 may include the following information for each agricultural field: geographic boundaries for the field; crops planted in the field from season-to-season, for example, corn, soybeans, etc.; yield data for these crops; organic matter samplings that have been taken in the field; topographic data, which may be in the form of an elevation map; irrigation data that may include an amount of water irrigated for the crop season; crop management practices; historical weather data; soil nitrate test results; manure applications; and a map of nutrient amounts that need to be added by fertilizer. The map of nutrient amounts that need to be added by fertilizer shown in database 116 deserves to be highlighted at this point, as it is the data that are produced by the computer program of the present invention. This map can be printed out in graphic format, or it can be used to create a site-specific fertilizer prescription for the field. The site-specific fertilizer prescription can then be downloaded, for example, and used in a conventional manner to control the rate that fertilizer is applied in a field. The information contained in database 116 will be discussed in more detail later, as that information is discussed in connection with a detailed discussion of the steps in the process of determining site-specific nutrient amounts to be applied to a field divided into multiple sites.

Figure 2:
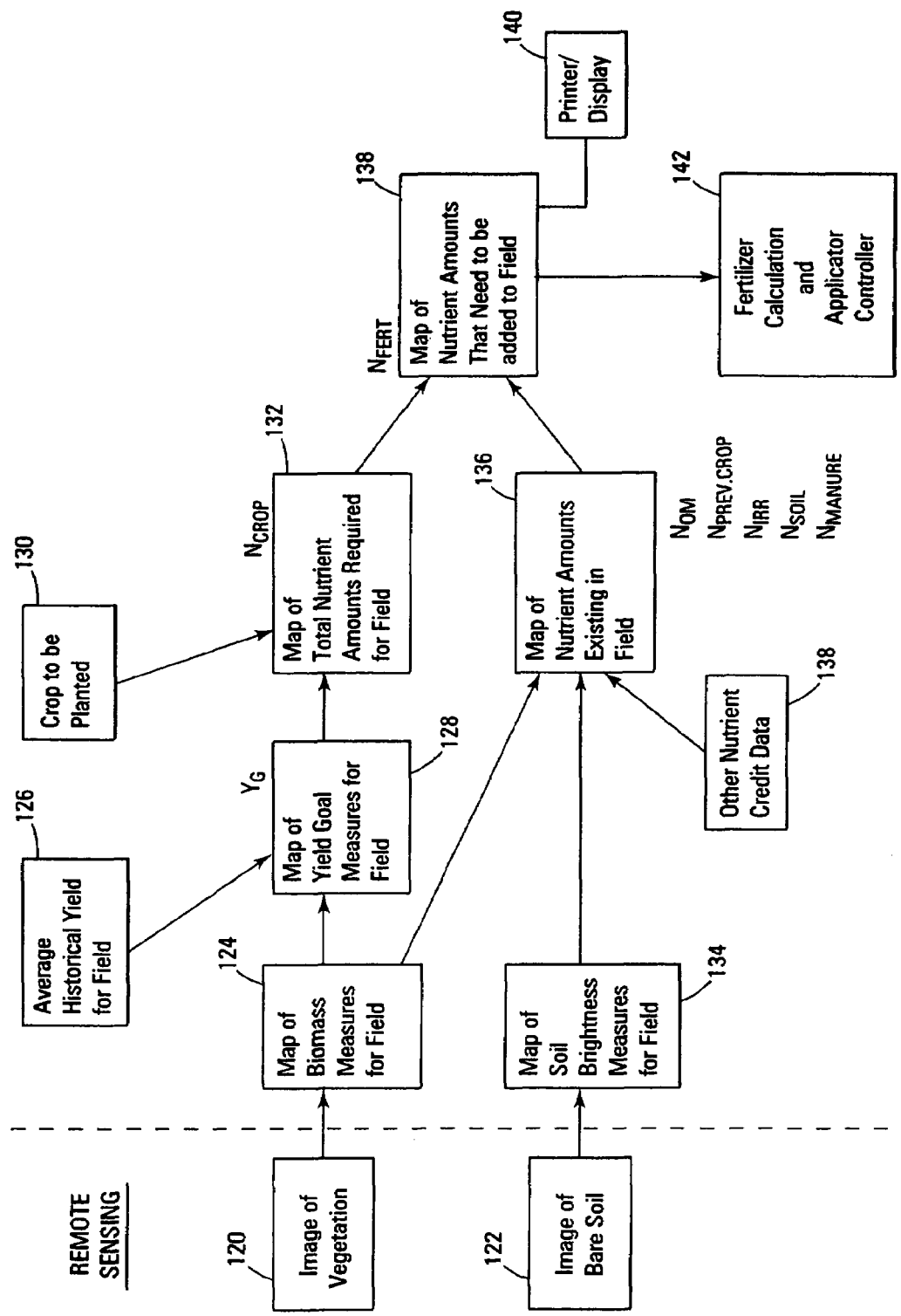
FIG. 2 is a conceptual diagram illustrating the operation of a computer program in accordance with the invention.

As shown in FIG. 2, conceptually the operation of a computer program in accordance with an embodiment of the invention. The specific example in FIG. 2 pertains to nitrogen, but the general concept of the invention will readily be seen to apply to other soil nutrients, such as phosphorous, potassium, organic fertilizers (e.g., manure), and micronutrients (e.g., Zn and Fe). Two remotely sensed images, for example, are used by the program in this embodiment of the invention. The first is an image of vegetation 120 for the field. This image is acquired, for example, when a previous crop is at or near its biomass peak. The second image is a bare soil image 122 for the field. This image is acquired, for example, prior to planting. From the raw image of vegetation 120, the computer program creates a map of biomass measures for the field 124. The measures for biomass may be, as an example, measures of leaf area index (LAI), using a conventional canopy reflectance model. Other measures of biomass could include a vegetation index derived from visible and near-infrared bands of images at peak biomass, such as NDVI and SVI. The map of biomass measures for the field 124, and using also a single-value measure for the average historical yield for the field 126, the computer program creates a map of site-specific yield goal ($Y_G$) measures for the field 128. As mentioned previously, biomass has a direct relationship to yield potential, and so in accordance with the invention, a map of site-specific yield goal measures for the field 128 is created and used in the calculation the fertilizer that is needed to be applied to the field. Then, from the map of yield goal measures for the field 128, and using also the crop type to be planted 130 given that different crops have different nutrient requirements, the computer program calculates a map of total nutrient amounts required for the field 132 (denoted $N_{CROP}$ using an example of nitrogen being the nutrient) for the particular crop to achieve the site-specific yield goals. As such, the map of total nutrient amounts required for the field 132 represents the amounts of nutrient needed to achieve the maximum possible yield that any particular location is capable of sustaining.

The lower half of FIG. 2 generally depicts the calculations needed to determine the amount of nutrient, in this case nitrogen, that already exists in the soil, or in other words, the nutrient credits. The nutrient credits—for example, $N_{OM}$, $N_{PREV.CROP}$, $N_{IRR}$, $N_{RES.SOIL}$, and $N_{MANURE}$—are subtracted from the total amount of nutrient required for the crop ($N_{CROP}$). In more detail, from the bare raw image of bare soil 122, the computer program creates a map of soil brightness measures for the field 134, using conventional models such as canopy reflectance. Soil brightness is related to organic matter content in the field, and in the case of nitrogen, the organic matter credit $N_{OM}$. As such, the map of soil brightness measures 134 enters into the calculation of a map of nutrient amounts existing in the field 136. In addition, biomass of a previous year's crop is related to the nutrient credit for that crop ($N_{PREV.CROP}$), and so the map of biomass measures for the field 124 also enters into the calculation of the map of nutrient amounts existing in the field 136. Residual soil nutrients, for example, nitrogen ($N_{RES.SOIL}$) from previous fertilizer application are related to soil organic matter that is derived from soil brightness for the field 136. Other nutrient credit data 138, such as information pertaining to irrigation and manure application, also enter into the map of nutrient amounts existing in the field 136.

The map of nutrient credits 136 are subtracted from the map of total nutrient amounts required 132 to produce a map of nutrient amounts that need to be added to the field 138. As discussed above, the map 138 can be printed out in graphic form on printer 140. The map 138 can be used, as depicted by block 142, to calculate yet another map of the amounts of a particular nitrogen-based fertilizer that needs to be added to the field, which in turn would be used to control the application of the fertilizer in a conventional location-based application method.

Figure 3:
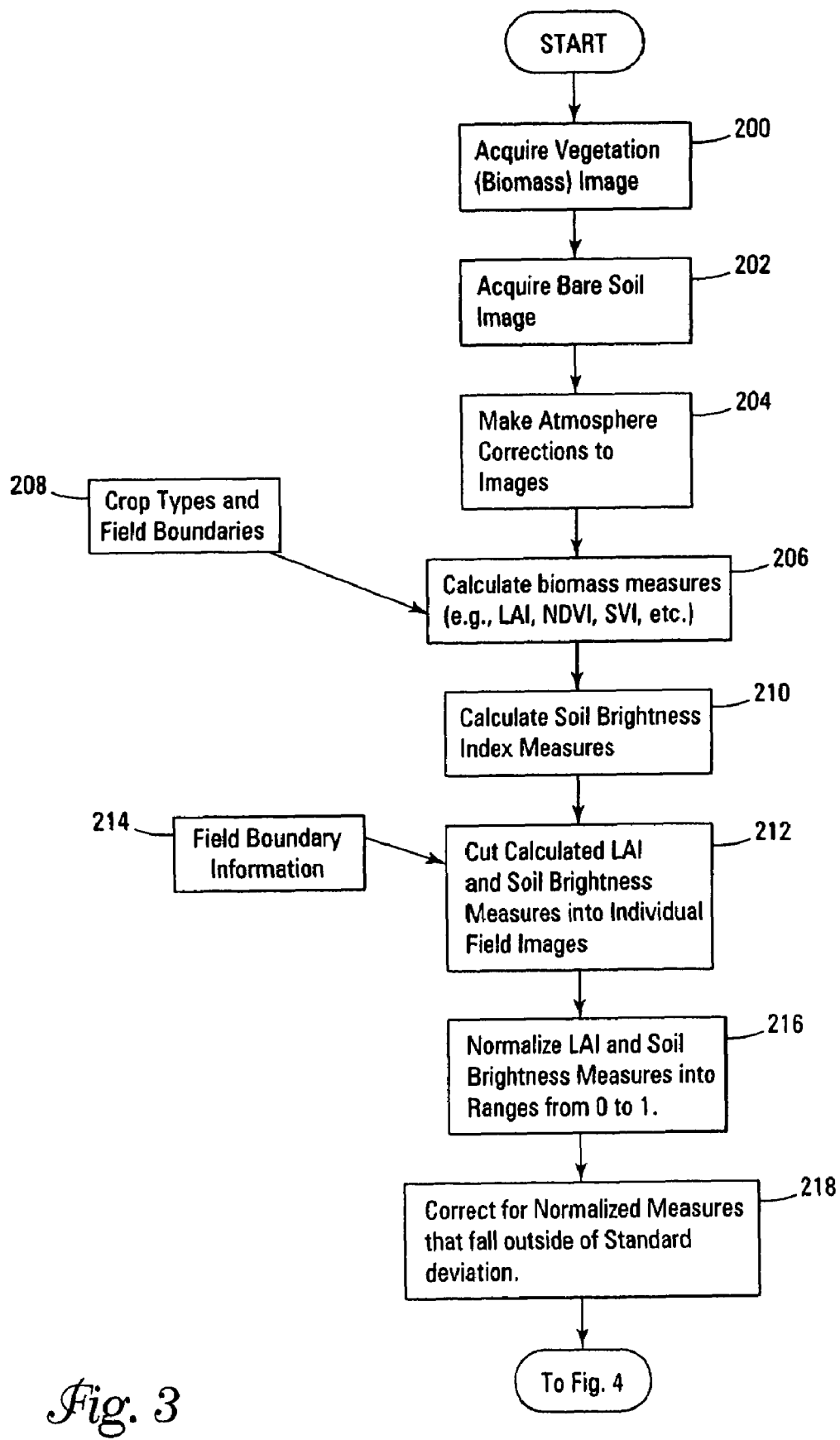
FIGS. 3-5 are flowcharts of steps performed by a computer program operating in accordance with the invention.
Figure 4:
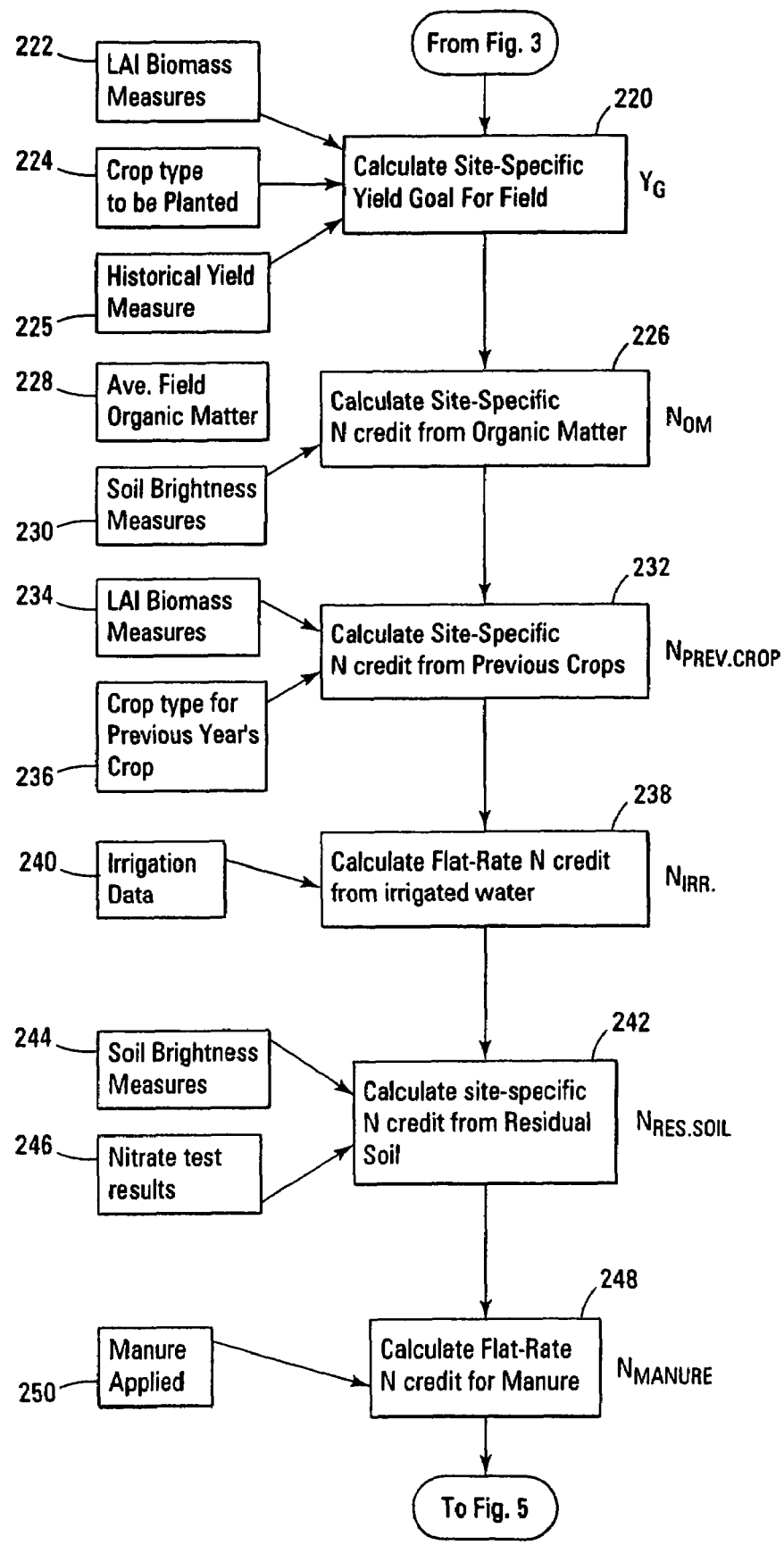
Figure 5:
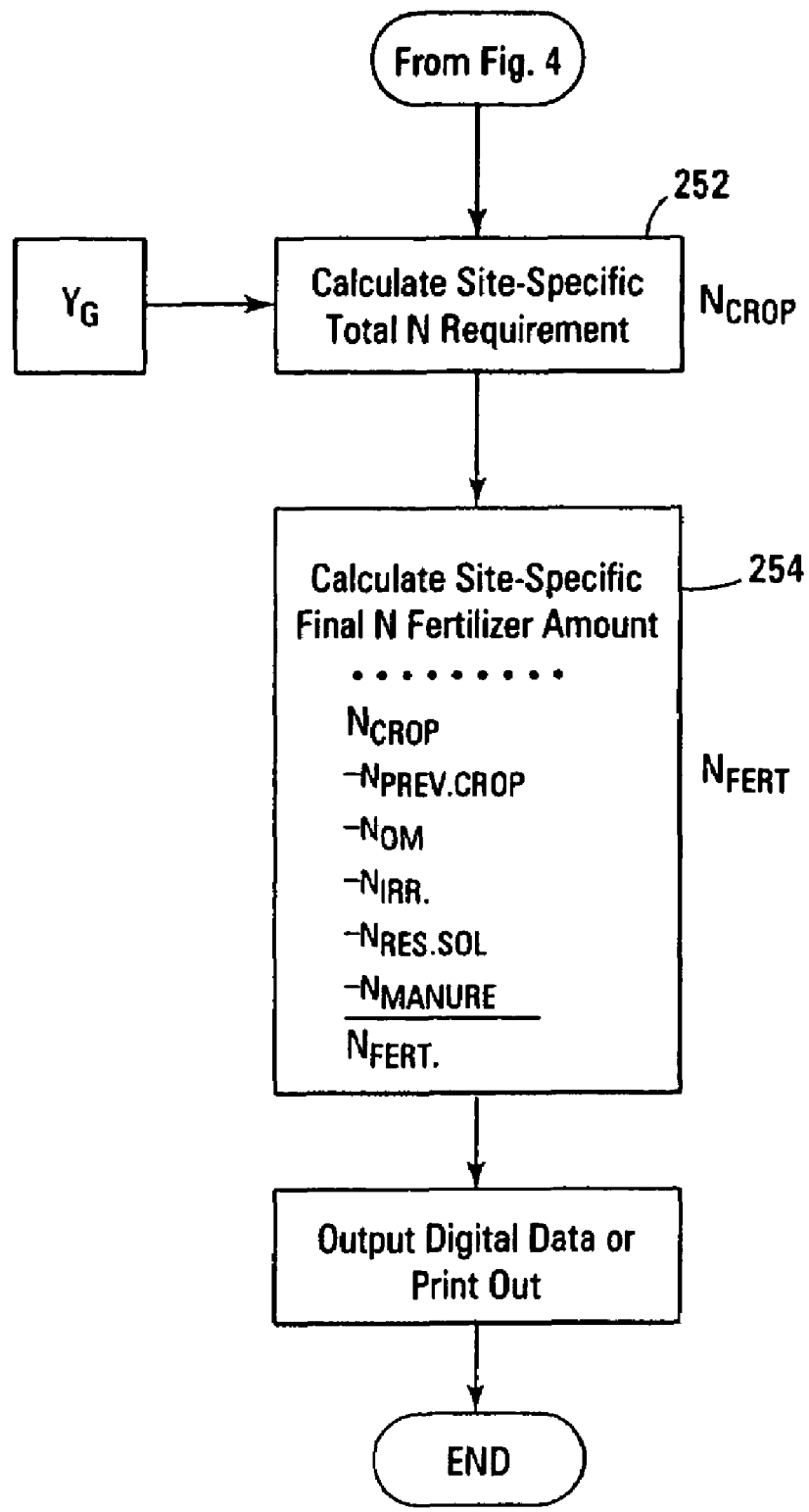

FIGS. 3-5 are flowcharts that show an example of processing steps that could be used to implement the embodiment of the invention shown in FIG. 2. It will be understood that many of the steps in the flowchart need not be in the order depicted, while others will need to be in the order indicated because the step is predicated on data calculated in a prior step. The process begins with image acquisition 200 and 202. The time window for the maximum vegetation, or biomass, image acquisition 200 is during a crop's last vegetative state, which for example in the U.S. cornbelt is from mid-July to mid-August. The biomass image 200 may be of the last crop season or any of the last five crop seasons with favorable weather conditions when the image was acquired. The biomass image is preferably a multi-spectral image, including green, red and infrared channels. The time window for the bare crop image acquisition 202 is during the pre-planting stage, which in the U.S. cornbelt is from April to early May. The bare soil image may be either a panchromatic (black and white) or a multi-spectral image.

As mentioned above, the images are, for example, satellite images acquired by a commercial satellite such as SPOT 1, 2, 4, Landsat TM 5 and 7, or IRS 5 meters. Satellite acquired multi-spectral images will preferably have 30-meter or less spatial resolution. Panchromatic images generally have better resolution on the existing commercial satellites, and so preferably these images will be acquired with 20-meter or less special resolution either from satellite or airborne platforms. It is possible to obtain images from one of a number of commercial vendors, who may need to acquire a particular image that is requested of a customer, or the vendor may already have acquired a requested image. One vendor, for example, is SPOT Image Corporation (1897 Preston White Drive, Reston, Va. 20191-4368, United States), who provides images in compact disc (CD) format. The image typically covers a 120 by 120 square-mile area for Landsat, and 36 by 36 square-mile area for SPOT. Multi-spectral images of the above mentioned satellites typically have an individual pixel size of 30 by 30 square meters, whereas panchromatic images typically have a pixel size of 10 by 10 square meters. The software program may require geo-referencing of the image to a particular coordinate or globally map-projected reference system, such as Universal Transverse Mercator (UTM) with WGS 84 datum within one pixel error. In addition, the images may be accompanied by a scene sensor parameter file that includes absolute calibration values, solar angle, satellite view angle, and relative azimuth angle for each band and each scene of images, which is used, at block 204, to make an atmospheric correction to the images and, at block 206, to calculate leaf area index (LAI) for biomass measures. The atmospheric correction may be done using a relatively simple atmospheric correction algorithm to calculate canopy reflectance to eliminate haze, water vapor, ozone, aerosol, etc. See Kaufmann et al., "Algorithm for automatic atmospheric corrections to visible and near-IR satellite imagery," *Int'l Jnl. of Remote Sensing*, 9:1357-1381 (1988); Richter, "A fast atmospheric correction algorithm applied to Landsat TM images," *Int'l Jnl. of Remote Sensing*, 11: 159-166 (1990); Richter, "Correction of atmospheric and topographic effects for high spatial resolution satellite imagery," *In'l Jnl. of Remote Sensing*, 18:1099-1111 (1997).

Next at block 206, a map of leaf area index (LAI) is calculated from the corrected image using a conventional canopy reflectance or other similar model, for example, as described in Verhoef, 1985 and Kuusk, 1995. Such a model for calculating LAI in this embodiment is also coupled with an inversion procedure that includes a search algorithm to achieve the inversion procedure. In the inversion procedure, a search algorithm searches a look-up table database created by the canopy reflectance model for LAI and other model parameters to "match up" each pixel with a minimum error. The use of such a search algorithm enables the calculation of LAI in an excellent speed. In addition, a vegetation index, such as NDVI and SVI, can also be derived from visible and near-infrared bands of images to infer the amount of biomass. Information 208 from database 116 (FIG. 1) about the crop types that were in the fields when the maximum biomass image was acquired, as well the geographic boundaries for the fields included in an image, are both included as inputs in the calculation of the LAI map. An alternative procedure can be accompanied by using the maximum biomass image to obtain crop information using an image classification method. By way of example, an acquired image may include an area of 120 by 120 square miles, and thus include many agricultural fields included in database 116 (FIG. 1). Also, different fields may have different crops planted at the time of image acquisition. Therefore, the processing at block 206 takes this field boundary information and the crop information from each field and uses that to calculate the LAI map for the field.

At block 210 a map of soil brightness index is calculated. Generally, the soil brightness index may be a relatively simple calculation involving the normalization of the bare soil image (either panchromatic or multi-spectral image) into a certain range of numbers. In addition, the soil brightness index can be developed with a soil reflectance model or "soil line" methods. The "soil line" method is to use visible and near infrared bands with a rotation of the multi-spectral data from the origin. At 212, the maps of LAI and soil brightness index measures are cut into individual image files for the agricultural fields in database 116 (FIG. 1). To do this field boundary information 214 is again needed. Then at 216 and 218 the LAI and soil brightness index measures are normalized into ranges between 0 and 1 within a field boundary, and values of the measures that fall outside a calculated standard deviation are corrected.

Referring to the same flow diagram but now on FIG. 4, at 220 a map of site-specific yield goal ($Y_G$) measures for a particular field are calculated, based on the map of LAI biomass measures for the field 222, the particular crop to be planted in the field 224, and historical yield results for past crops produced in the field 226. The historical yield measure 225 in this embodiment is a single measure for the entire field, though the single measure may be the average yield over the last five crop years. The yield goal distribution across a given field will typically be correlated to LAI, as yield goal has the same spatial distribution pattern as LAI across the field. The distribution of yield goal measures may correspond to at least 90% of the total distribution of the corresponding LAI measures, with each end of the distribution getting 5% cut off. This is done to minimize a skewed distribution and inaccurate measures resulting from an inaccurate field boundary. The lower limits of a given field's yield goal ($Y_G$), for example, may be set to be 50 bushels/acre for a location. This is done to guarantee that there will be enough N-based fertilizer for a low elevation spot where there is typically waterlogging in the field in the event that the upcoming growing seasons turns out to be abnormally dry.

In steps 226, 232, 238, 242 and 248 the nutrient credits are calculated for the agricultural field. At 226 a site-specific nitrogen (N) credit for organic matter ($N_{OM}$) is calculated. Entering into calculation 226, and shown by the input at 228, is the average field organic matter content (% of dry weight) measured in the last five-years of soil samples. It may be assumed that the field organic matter content is not changing in the last five years. Also entering into calculation 226 is the map of soil brightness measures 230 for the field. Soil brightness has a known relationship to organic matter content, topography, and soil moisture distribution. A lower soil brightness corresponds to higher soil organic matter content, a lower position in the field's topography, and a relatively higher soil moisture. In similar manner to calculation 220, upper and lower limits may be set for the distribution of normalized soil brightness and average field organic matter content.

At 232 a site-specific N credit from a previous crop ($N_{PREV.CROP}$) is calculated, based on the map of LAI biomass measures for the field 234 and the previous growing season's crop type. The most common reason for such a credit is when the previous crop was a crop of soybeans or other legume crops. By way of example, the average N credit for a previous season crop of soybeans may be 30 pounds/acre because soybeans fix nitrogen in the soil. The N credit for a previous soybean crop is also related to the biomass of that crop, and thus the biomass measures 234 enter into the calculation at 232. At 238 a flat-rate N credit for having irrigated water ($N_{IRR}$) is calculated. This requires inputs 240 that may include, for example, the total amount in inches of irrigated water over a period of time and a number in parts-per-million (ppm) of nitrate N in the water for the particular season and location. The average N credit from irrigated may be estimated to be 2.7 pound-N/acre-foot per ppm nitrate N. See Havlin, 1999.

At 238 a site-specific N credit for residual soil ($N_{RES.SOIL}$) is calculated. The number in ppm of average nitrate N for the given field may be calculated based on the previous crop type and management practices, weather conditions, and topography of the field. This information may also be obtained through soil nitrate testing done before fertilizer is applied. In one embodiment, $N_{RES.SOIL}$ is based on normalized values for soil brightness index 244 and average ppm nitrate N from soil nitrate testing 246. As discussed in connection with other steps, again there may be set upper and lower limits for the distribution of the normalized values. By way of example, the average N credit may be 3.6 pound-N/ppm nitrate N. See Havlin, 1999. At 248 a flat-rate N credit for manure ($N_{MANURE}$) is calculated, based on inputs 250 of the amount of manure applied per acre and the type of manure applied (for example, from a hog farm or a chicken farm). The average N credit for manure may be 10 pound-N/ton-manure, depending again on the type of manure. See Havlin, 1999. The N credit for manure from a chicken farm would typically be greater than the N credit for manure from a hog farm. Manure also may affect soil nutrients in the following crop seasons depending on the condition of manure decomposition and nutrients removed from soils from crops.

Referring to FIG. 5, at 252 a site-specific total N requirement ($N_{CROP}$) is calculated, based on the site-specific yield goals calculated at 220 (FIG. 4) multiplied by an N conversion factor. As mentioned previously, this map of NCROP represents the amount of nitrogen needed to produce the maximum possible yield that the particular location is able to sustain. The conversion factor may range, for example, from 1.0 to 1.4 for most U.S. cornbelt soils. The N conversion factor preferably will be dependent on weather conditions and soil properties. At 254 the final map of site-specific measures of nitrogen ($N_{FERT}$) that needs to be added to the field is calculated by subtracting all the N credits ($N_{OM}$, $N_{PREV.CROP}$, $N_{IRR}$, $N_{RES.SOIL}$, and $N_{MANURE}$) from $N_{CROP}$. The map of $N_{FERT}$ measures is available to be used in the manners described previously.

Figure 6:
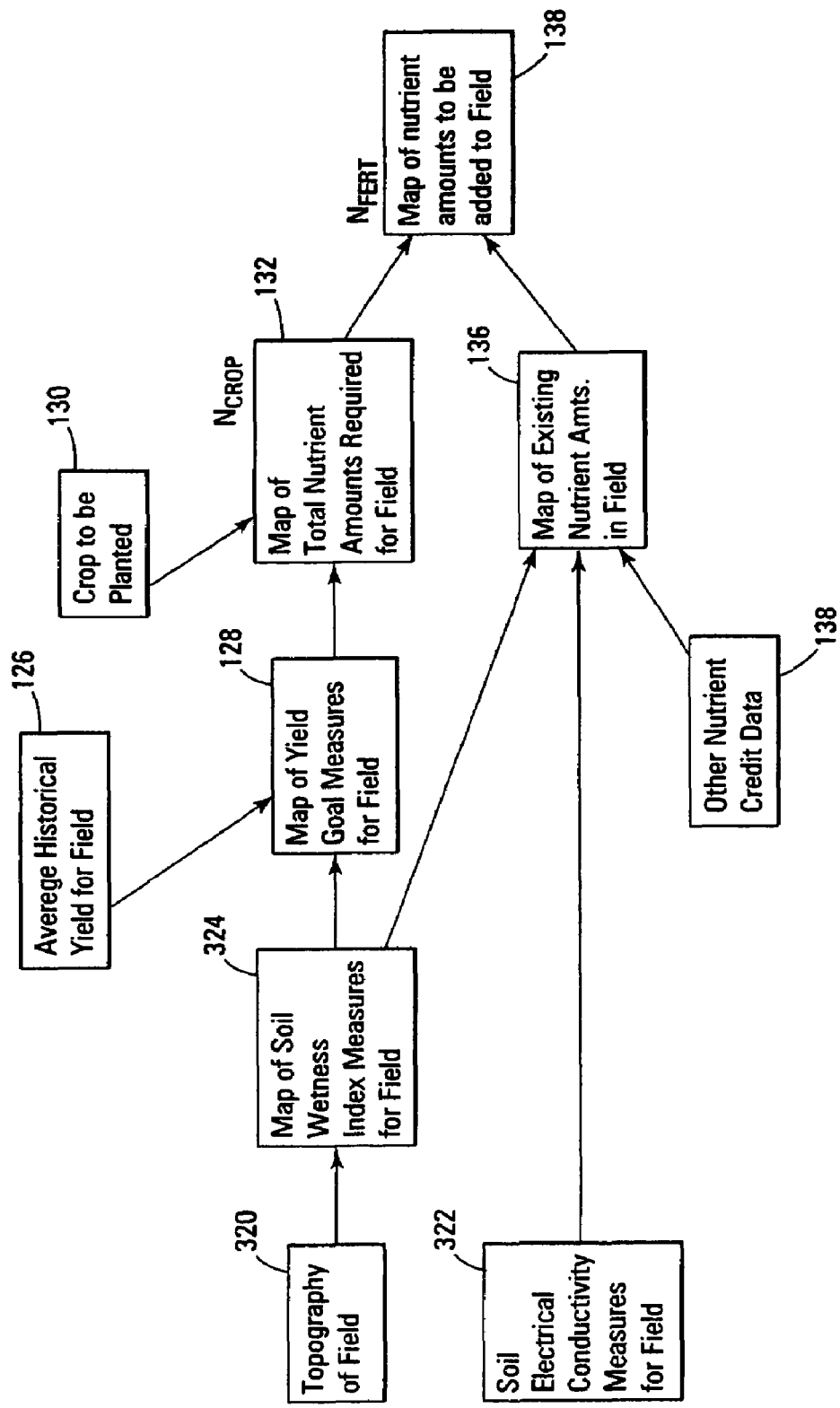
FIG. 6 is a conceptual diagram illustrating an alternative embodiment of the invention.

In an alternative embodiment, shown in FIG. 6, instead of being based on a maximum biomass image 120 as in the FIG. 2 embodiment, the map 128 of yield goal measures for the field is created based on a map 324 of soil wetness index (WI) measures for the field, which in turn is calculated based on topography data 320 for the field. Previous research has shown a direct relationship between the amount of water available and yield variability in a field. Water effects on yield are believed to be the result of a combination of total precipitation amount and distribution of the precipitation during the season. A field sub-area with stress causing yield reduction in a field can be caused by either lack or excess of water. For example, a high wetness index area may be subjected to excessive soil moisture during parts of the season causing yield reductions by stand reductions, shallow roots and de-nitrification. On the other hand, a sub-field area with low wetness index may experience yield reductions due to lack of water. The extent to which this will occur depends on the weather that is by nature unpredictable. In a very dry year, for example, the areas of the field with high wetness indices will probably be the best producing area of a field, if not subjected to other factors such as pests and diseases.

The wetness index (WI) for a given point in a field may be calculated taking into account the total area draining to the field and the slope at the point, using the following equation:

$$WI = ln(As/\tan \alpha)$$

where: As=specific cachments area
α=slope angle

Figure 7:
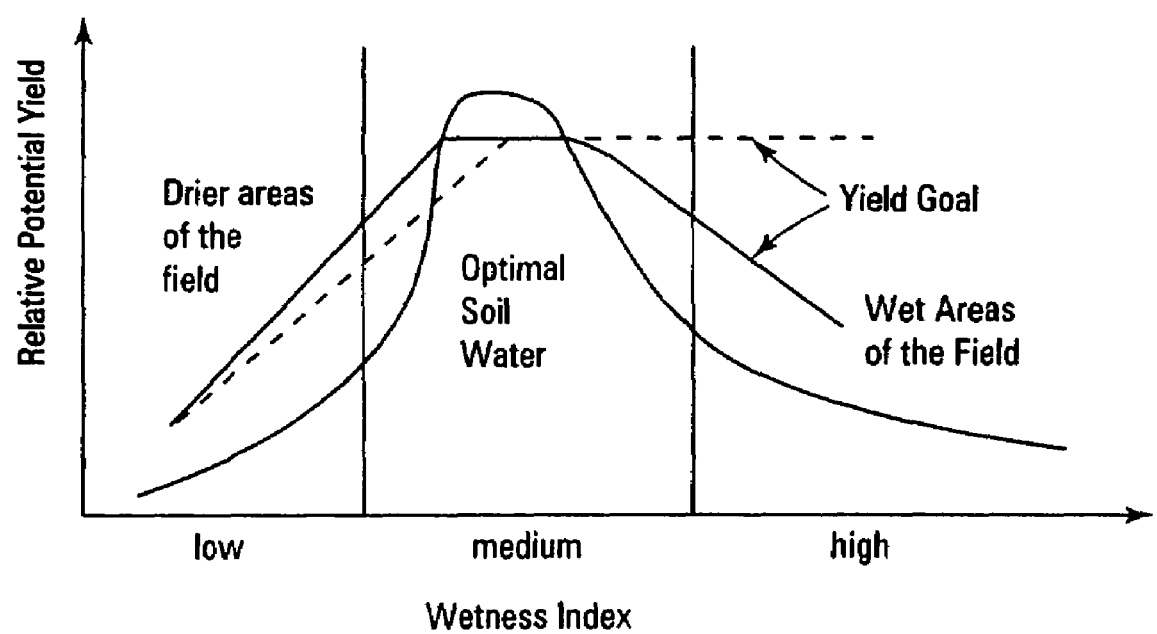
FIG. 7 is a graph illustrating a calculation used in the FIG. 6 embodiment.

See Moore et al., "Soil Attribute Prediction Using Terrain Analysis," in *Soil Sci. Soc. Am. Jnl.*, 57:443-452 (1993). The wetness index may be considered as an indicator of the probability of soil moisture levels during the season, the higher the wetness index for a given sub-area of a field, the higher the probability that the particular sub-area will experience higher levels of moisture during the season. The yield goal relationship shown in FIG. 7 may be shifted depending if the field is normally subjected to drainage problems (shift to the left) or to the right if the field is located in an upland position with well-drained soils or soils with low water-holding capacity. In fact, in the latter case it is possible that the yield goal would not decrease for high wet indices (dashed line).

Also shown in FIG. 6 is another alternative to the FIG. 2 embodiment. Instead of using a bare soil image 122 as a measure of organic matter in the field (FIG. 2), soil electrical conductivity (EC) measurements 322 made in the field are used (FIG. 6). Research has shown that soil EC positively correlates to organic matter. Soil EC thus may be used as a surrogate measurement to organic matter and the ability of the soil to supply N during the season.

As mentioned previously, the invention applies to soil nutrients other than nitrogen. For example, the invention applies to phosphorous (P), potassium, micronutrients such as Zn and Fe, and organic fertilizer such as manure. The calculations will of course differ depending on the nutrient, but the inventive aspects remain the same. To give an example of some of the possible differences between calculations for different nutrients, nitrogen existing in soil is in large part depleted or washed away each growing season (except of course, if the crop is soybeans, as noted previously). For other nutrients, notably phosphorous, this is not the case, and so the past management of the field with respect to the particular nutrient will weigh much more heavily in the calculation of the site-specific amounts of the nutrient that need to be applied to a field. Also, with respect to phosphorous, it is known that the pH of the soil directly relates to the amount of phosphorous in the soil. As such, an implementation of the invention to provide a prescription for phosphorous application may require soil pH samples, although there may be other ways to estimate pH in various locations of a field. In addition, the phosphorous prescription may also include biomass measures to determine the site-specific maximum possible crop yields for the field. It will be recognized that the invention will be particularly useful to provide a phosphorous prescription in areas where the lack of phosphorous in the soil is a particular problem, such as in areas of Brazil.

A number of embodiments of the invention have been described. Nevertheless, it will be understood that various modifications may be made without departing from the spirit and scope of the invention. Accordingly, other embodiments are within the scope of the following claims.

The invention claimed is:

1. A method implemented in at least one computer program to provide a map of site-specific amounts of a soil nutrient to be applied in fertilizer to an agricultural field divided into sites, the method comprising:
   calculating for the field, by use of a map of site-specific measures of a soil wetness index, a map of site-specific amounts of the soil nutrients needed to produce at each site a maximum possible crop yield; and
   subtracting, from the site-specific amounts of the soil nutrient needed to produce at each site a maximum yield, site-specific measures for the soil nutrient existing in the field, thereby producing a map of site-specific amounts of the soil nutrient to be applied in fertilizer to the field.

2. The method of claim 1, wherein the soil nutrient is nitrogen, phosphorous, or potassium.

3. The method of claim 1, wherein the soil nutrient is organic fertilizer or manure.

4. The method of claim 1, wherein the soil nutrient is a micronutrient.

5. The method of claim 4, wherein the micronutrient is Zn or Fe.

6. The method of claim 1, further comprising:

calculating for the field, from a map of site-specific image data taken of the field in a bare soil state, a map of site-specific measures of soil brightness; and calculating the site-specific measures of the soil nutrient existing in the field from at least the map of site-specific measures of soil brightness.

7. The method of claim 1, wherein the site-specific measures of the soil nutrient existing in the field are calculated from at least a map of a site-specific measure of soil electrical conductivity.

8. A computer program, residing on a computer-readable medium, for providing a map of site-specific amounts of a soil nutrient to be applied in fertilizer to an agricultural field divided into sites, the computer program comprising:

instructions for causing a computer to:

calculate for the field, from a topographic map for the field, a map of site-specific measures of a soil wetness index;

calculate for the field, from the map of site-specific measures of a soil wetness index, a map of site-specific amounts of the soil nutrient needed to produce at each site a maximum possible crop yield; and subtract, from the site-specific amounts of the soil nutrient needed to produce at each site a maximum possible crop yield, site-specific measures of the soil nutrient existing in the field, thereby producing a map of site-specific amounts of the soil nutrient to be applied in fertilizer to the field.

9. The computer program of claim 8, wherein the soil nutrient is nitrogen, phosphorous, or potassium.

10. The computer program of claim 8, wherein the soil nutrient is organic fertilizer or manure.

11. The computer program of claim 8, wherein the soil nutrient is a micronutrient.

12. The computer program of claim 11, wherein the micronutrient is Zn or Fe.

13. The computer program of claim 8, wherein the instructions further cause the computer to:

calculate for the field, from a map of site-specific image data taken of the field in a bare soil state, a map of site-specific measures of soil brightness; and calculate the site-specific measures of the soil nutrient existing in the field from at least the map of site-specific measures of soil brightness.

14. The computer program of claim 8, wherein the instructions cause the site-specific measures of the soil nutrient existing in the field to be calculated from at least a map of site-specific measure of soil electrical conductivity.

15. A method implemented in at least one computer program to provide a map of site-specific amounts of a soil nutrient to be applied in fertilizer to an agricultural field divided into sites, the method comprising:

calculating a map for the agricultural field of site-specific of soil nutrient amounts needed to produce at each site a maximum possible crop yield by use of a map of site-specific field characteristic data for the agricultural field generated using a satellite image of the agricultural field; and subtracting, from the site-specific soil nutrient amounts for maximum yield for the field, site-specific measures for the soil nutrient existing in the field, thereby producing a map of site-specific amounts of the soil nutrient to be applied in fertilizer to the field.

16. The method of claim 15, wherein the field characteristic is a measure of biomass produced by the field in one or more past growing seasons.

17. The method of claim 15, further comprising:

calculating, from a map of site-specific image data taken of the field during one or more past growing seasons, a map of site-specific measures of a leaf area index, the leaf area index serving as the measure of biomass produced by the field.

18. The method of claim 15, further comprising:

calculating, from a map of site-specific image data taken of the field during one or more past growing seasons, a map of site-specific measures of a vegetation index, the vegetation index serving as the measure of biomass produced by the field.

19. The method of claim 15, further comprising:

calculating, from a topographic map for the field, a map of site-specific measures of a soil wetness index, the wetness index serving as the field characteristic.

20. The method of claim 15, wherein the soil nutrient is nitrogen, phosphorous, or potassium.

21. The method of claim 15, wherein the soil nutrient is organic fertilizer or manure.

22. The method of claim 15, wherein the soil nutrient is a micronutrient.

23. The method of claim 22, wherein the micronutrient is Zn or Fe.

24. The method of claim 15, further comprising:

calculating for the field, from a map of site-specific image data taken of the field in a bare soil state, a map of site-specific measures of soil brightness; and calculating the site-specific measures of the soil nutrient existing in the field from at least the map of site-specific measures of soil brightness.

25. The method of claim 15, wherein the site-specific measures of the soil nutrient existing in the field are calculated from at least a map of site-specific measure of soil electrical conductivity.

* * * * *